US011868437B1

(12) United States Patent
Burnham et al.

(10) Patent No.: US 11,868,437 B1
(45) Date of Patent: Jan. 9, 2024

(54) TRAINING SET ENHANCEMENT FOR NEURAL NETWORKS

(71) Applicant: SIGHTHOUND, INC., Winter Park, FL (US)

(72) Inventors: R J Burnham, Winter Park, FL (US); Syed Zain Masood, Winter Park, FL (US); Sam Michel, Winter Park, FL (US); Jonathan Taylor, Winter Park, FL (US)

(73) Assignee: Sighthound, Inc., Winter Park, FL (US)

( * ) Notice: Subject to any disclaimer, the term of this patent is extended or adjusted under 35 U.S.C. 154(b) by 289 days.

(21) Appl. No.: 17/039,274

(22) Filed: Sep. 30, 2020

Related U.S. Application Data

(60) Provisional application No. 62/908,479, filed on Sep. 30, 2019.

(51) Int. Cl.
| | |
|---|---|
| *G06F 18/214* | (2023.01) |
| *G06N 3/08* | (2023.01) |
| *G06V 10/75* | (2022.01) |
| *G06F 18/21* | (2023.01) |
| *G06T 5/00* | (2006.01) |
| *G06N 20/20* | (2019.01) |
| *G06V 10/30* | (2022.01) |
| *G06V 10/82* | (2022.01) |
| *G06V 10/774* | (2022.01) |

(52) U.S. Cl.
CPC ...... *G06F 18/2148* (2023.01); *G06F 18/2178* (2023.01); *G06N 3/08* (2013.01); *G06N 20/20* (2019.01); *G06T 5/001* (2013.01); *G06V 10/30* (2022.01); *G06V 10/7515* (2022.01); *G06V 10/774* (2022.01); *G06V 10/82* (2022.01); *G06T 2207/10004* (2013.01); *G06T 2207/20081* (2013.01); *G06T 2207/20182* (2013.01)

(58) Field of Classification Search
None
See application file for complete search history.

(56) References Cited

U.S. PATENT DOCUMENTS

| | | | |
|---|---|---|---|
| 10,771,867 B1* | 9/2020 | Chemolosov | G06F 16/739 |
| 2004/0170337 A1* | 9/2004 | Simon | G06V 40/162 |
| | | | 382/254 |
| 2017/0278546 A1* | 9/2017 | Xiao | G06T 5/00 |
| 2018/0253869 A1* | 9/2018 | Yumer | G06T 11/60 |
| 2019/0110002 A1* | 4/2019 | Zhang | H04N 5/2228 |
| 2020/0125818 A1* | 4/2020 | Chan | G06N 3/047 |
| 2020/0160105 A1* | 5/2020 | Kehl | G06F 18/214 |
| 2020/0257974 A1* | 8/2020 | Yano | G06N 3/08 |
| 2020/0334501 A1* | 10/2020 | Lin | G06F 18/214 |
| 2020/0380366 A1* | 12/2020 | Wang | G06F 18/241 |
| 2021/0042572 A1* | 2/2021 | Price | G06K 9/6253 |

(Continued)

*Primary Examiner* — Emily C Terrell
*Assistant Examiner* — Nathan J Bloom
(74) *Attorney, Agent, or Firm* — Haynes and Boone, LLP

(57) ABSTRACT

Embodiments for training a deep neural network by applying tags to enhanced versions of a raw data set are disclosed. In one embodiment, the raw data set may comprise, for example, images, and the method may comprise receiving the raw data set of images, applying an enhancement to the images, deriving tags based on the enhanced images while maintaining a correlation to the original raw images, and using the raw images and the tags to train a deep neural network.

25 Claims, 7 Drawing Sheets

(56) References Cited

U.S. PATENT DOCUMENTS

| | | | |
|---|---|---|---|
| 2021/0158533 A1* | 5/2021 | Cui | G06T 7/11 |
| 2022/0114207 A1* | 4/2022 | Kawabata | G06F 16/535 |
| 2022/0180447 A1* | 6/2022 | Kearney | G06V 30/413 |

* cited by examiner

TRAINING SET ENHANCEMENT FOR NEURAL NETWORKS

CROSS REFERENCE TO RELATED APPLICATIONS

This application claims the priority benefit of U.S. Provisional Patent Application No. 62/908,479 filed 30 Sep. 2019, hereby incorporated by reference in its entirety as though fully set forth herein.

FIELD OF THE INVENTION

The present disclosure generally relates to training neural networks using an annotated training set. The disclosure relates more particularly to apparatus and techniques for annotating based on enhanced and corrected images and training an artificial neural network for deep learning with original images and the annotations.

BACKGROUND

Deep learning is a part of machine learning that uses multiple layers of artificial neural networks (and variants) in an attempt to replicate how a human brain works. Artificial neural networks are a system of interconnected "neurons" that exchange messages between each other. The connections have numeric weights that can be tuned based on experience, making neural nets adaptive to inputs and capable of learning. Deep learning is similar to traditional multilayer neural networks A deep neural network is a type of artificial neural network. One difference between a single-layer-hidden neural network and a deep neural network is the number of node layers, referred to as the depth. Earlier versions of neural networks were shallow and composed of one input, one output, and one hidden layer.

A deep neural network is expected to take an input at one end, process the input through the hidden layers and come up with an output from the other end. For example, to detect whether there is a person present in an image, a deep network might take the image in question as its input, process the image through its layers to make a determination, and output a confidence of how likely it is that a person is present in the image. Before a deep network system can accurately solve that problem, a training system trains the deep network system so that it knows what a person looks like. That is, the training system will train the deep network to correctly return a positive or negative result when presented with an image. Continuing on with the person classification example described above, in order to train a system to know if a person is present in the image or not, the training system is presented with a multitude of images labeled with whether a person is present in the image. This is referred to as the deep learning "training phase." The purpose is to show the deep network enough labeled image samples so that it is able to tweak the hidden layer weights and parameters to get the right answer with high confidence. Training the system across a variety of environmental conditions, including but not limited to variations in lighting, occlusion, pose, angle, color, etc., ensure the trained deep network is robust. More data and variations help make the system more robust and accurate.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for creating a training set for a neural network from a base set. The computer-implemented method also includes receiving the base set; providing a raw digital item of the plurality of raw digital items to a user via a user interface, the user interface providing at least an option to enhance the raw digital item with at least one enhancement; using the user interface, receiving a request to enhance the raw digital item with the at least one enhancement; using an enhancement module, applying the at least one enhancement by enhancing the raw digital item to produce an enhanced digital item; deriving at least one tag based at least on the enhanced digital item; associating the at least one tag with the raw digital item; and processing the at least one tag and the raw digital item with a training system to produce a trained neural network. Other embodiments of this aspect include corresponding computer systems, apparatus, and computer programs recorded on one or more computer storage devices, each configured to perform the actions of the methods.

Implementations may include one or more of the following features. The method where the plurality of raw digital items includes one of a plurality of images, a plurality of videos, and/or a plurality of sound recordings. The method further including receiving, from the user via the user interface, a boundary around a region in an image of the plurality of images, or around a region in a frame of a video of the plurality of videos, or around a region of a sound recording of the plurality of sound recordings. The method further including receiving, from the user via the user interface, a label or tag indicating what the boundary contains. The plurality of raw digital items may include a plurality of sound recordings, where the at least one enhancement includes at least one of suppression of background noise, adjusting pitch, or adjusting a speed of audio playback. The plurality of raw digital items may include one of a plurality of images or a plurality of videos, where the at least one enhancement includes at least one of rotation, scaling, color shift, contrast adjustment, brightness adjustment, gamma adjustment, sharpening, de-blurring, de-noising, de-fisheye, edge detection, tone map adjustment, color channel swapping, or image filtering. The enhancement module may store the at least one enhancement in an enhancement database, the method further including: receiving feedback from the user interface on an effectiveness of the at least one enhancement; storing the feedback in the enhancement database; and training an enhancer neural network based on contents of the enhancements database. The enhancement database also includes information about raw digital items that can be tagged without enhancement. The at least one enhancement is applied to each raw digital item of the base set to create an enhanced set including a plurality of enhanced digital items, the method further including: deriving at least one tag based on each enhanced digital item of the enhanced set to create a set of tags; and processing the set of tags and the base set by the training system to produce the trained neural network. A first correlation set may be stored, correlating each enhanced digital item of the enhanced set to a particular raw digital item of the base set, a second correlation set may be stored, correlating each tag of the set of tags to an enhanced digital item of the enhanced set, and a third correlation set may be calculated, correlating each tag to one of the raw digital items of the base set, the third correlation provided to the training system with the set of tags and the base set. Deriving the at least one tag based on the enhanced digital item may be further based on the raw digital item, the user interface presenting both the enhanced digital item and the raw digital item. Implementations of the described techniques may include hardware, a method or process, or computer software on a computer-accessible medium.

One general aspect includes a system at least one computing device configured to implement one or more services, where the one or more services are configured to: receive a base set including a plurality of raw digital items; apply an enhancement to a raw digital item of the base set to create an enhanced digital item corresponding to the raw digital item; receive at least one tag based at least on the enhanced digital item; associate the at least one tag with the raw digital item; and process the at least one tag and the raw digital item with a training system to produce a trained neural network. Other embodiments of this aspect include corresponding computer systems, apparatus, and computer programs recorded on one or more computer storage devices, each configured to perform the actions of the methods.

Implementations may include one or more of the following features. The system where the plurality of raw digital items is one of a plurality of images or a plurality of videos. The enhancement may include at least one of rotation, scaling, color shift, contrast adjustment, brightness adjustment, gamma adjustment, sharpening, de-blurring, de-noising, de-fisheye, edge detection, tone map adjustment, color channel swapping, or image filtering. The plurality of raw digital items may include a plurality of sound recordings. The enhancement may include at least one of suppression of background noise, adjusting pitch, or adjusting a speed of audio playback. The at least one tag may be received from a training neural network configured to localize and classify items in the enhanced digital item. The training neural network may provide confidence levels for each tag of the at least one tag, where a user interface is configured to allow a user to review low confidence tags. An enhancement module stores the enhancement in an enhancement database, where the one or more services are further configured to: receive feedback from a user interface on an effectiveness of the enhancement; store the feedback in the enhancement database; and train a neural network based on the enhancements database. The enhancement is applied to each raw digital item of the base set to create an enhanced set including a plurality of enhanced digital items, where the one or more services are further configured to: derive at least one tag based on each enhanced digital item of the enhanced set to create a set of tags; and process the set of tags and the base set by the training system to produce the trained neural network. A first correlation is stored correlating the enhanced digital item the raw digital item, a second correlation is stored correlating the at least one tag to the enhanced digital item, and a third correlation calculated correlating the at least one tag to one of the raw digital item, where the third correlation is provided to the training system. A user interface module presents the raw digital item to a user to allow the user to provide the at least one tag, the user interface module presenting both the enhanced digital item and raw digital item. Implementations of the described techniques may include hardware, a method or process, or computer software on a computer-accessible medium.

One general aspect includes a computer-implemented method for creating a training set for a neural network from a base set including a plurality of raw images. The computer-implemented method includes receiving the base set; providing the base set to an enhancing neural network which, for at least one raw image of the base set, selects an enhancement to the raw image to create an enhanced image; providing the enhanced image and the at least one raw image to a user interface; receiving, from the user interface, feedback regarding the enhancement and at least one tag for the raw image; training a second enhancing neural network based on the feedback; and training a third neural network based on the at least one tag and the base set. Other embodiments of this aspect include corresponding computer systems, apparatus, and computer programs recorded on one or more computer storage devices, each configured to perform the actions of the methods.

Implementations may include one or more of the following features. The computer-implemented method where the feedback includes assigning a value indicating effectiveness of the enhancement. The feedback may allow applying a second enhancement. Implementations of the described techniques may include hardware, a method or process, or computer software on a computer-accessible medium.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which.

DETAILED DESCRIPTION

Figure 1:
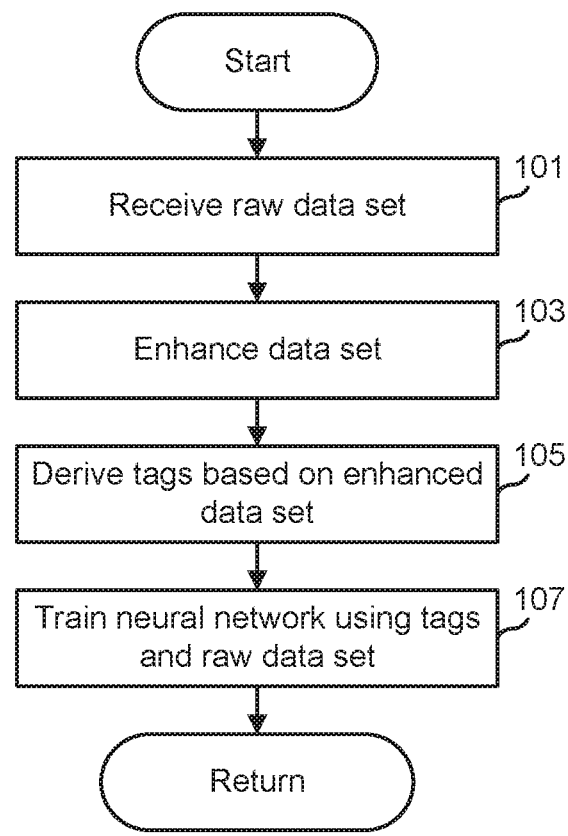
FIG. 1 is a flowchart illustrating a method of tagging a dataset for use in training a neural network.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In the training stage, a training system may feed a neural network a training set comprising large amounts of labeled data. The training set can determine the accuracy of the neural network's predictions for the task. Building an accurate deep network prediction model relies on the amount and variety of data in the training set as well as the quality of the labeling in the training set. The process of preparing the data for deep neural network training is called data labeling, data annotation, or tagging. Labeling or annotating the data often reflects an understanding of the task the deep neural network is designed to solve, but not always. The labeling of the data may be manual, automated, or a combination of the two.

Techniques described and suggested herein include methods and apparatus to create an annotated training set by enhancing at least some digital items in the input training set of digital items, prior to tagging, to create an enhanced training set. The labeling system, which may be either manual or automated, creates tags based on the enhanced training set or a combination of the enhanced training set and the input training set. The tags may then be applied to the original, unenhanced input training set and the resulting annotated training set provided to the training system.

In another embodiment, the training images are presented to a user to select an enhancement and the enhanced images can be evaluated by the user to rate the effectiveness of the enhancement. The same or a different user may then label the training set with tags. The corresponding tags for those training images are input by the human reviewer, but because the human is viewing the enhanced image, that can save time for data entry as well as make the data entry more accurate and complete. When training the neural network for object recognition, the unenhanced images and the tags are the input to the neural network, rather than requiring the enhanced images and the tags. In production, the input to the trained neural network can then be unenhanced images. The neural network may recognize objects possibly as well as if the input images were enhanced and the neural network trained on the enhanced images. This can save on run-time effort where images are recognized in real-time, since a real-time image enhancement process is not needed.

In one embodiment, a user evaluates whether a digital item may benefit from an enhancement, chooses an enhancement, and applies the chosen enhancement. The user then performs the labeling task on the enhanced image. The neural network is trained on unenhanced training digital items and tags provided by humans who viewed the enhanced training digital items. In an example where the digital items are images, tags for an image might comprise bounding boxes and possibly object type and/or object names assigned to the bounding boxes for objects present in that image. For a well-trained neural network, it might output reasonable guesses for the bounding boxes and tags for an input image.

In another embodiment, the training set comprises images. The images are analyzed by an AI system designed to detect images that need enhancement and what type of enhancement is necessary. This enhancing AI system is trained as human users use a user interface to select enhancements to images. These images and enhancements can then become inputs to the enhancing AI system. As the training set is provided to the user interface, a human user may use the user interface to perform the training set task (e.g., identify people, cars, license plates, text, or other image features) or may use the user interface to select an enhancement. The enhancement may be stored in an enhancement database. If no enhancement is necessary, that may also be stored, as recognizing images not needing enhancement can be part of the enhancing AI system. After the enhancement, the human user may indicate if the enhancement aided performing the training set task, which may also be stored in an enhancement database. After enhancement, or immediately if the initial image was satisfactory, the human user may use the user interface to perform the training set task.

Performing the training set task may be facilitated by the user interface providing the human user the ability to draw bounding boxes around regions in the image (or regions in a frame of a video, or around segments of an audio recording where particular sounds are believed to occur). The training task may also include labeling what the bounding boxes contain. The training task may also include labeling the image as containing an item or by labeling the image by selecting from a set of possible tags. As an example, the user interface may provide graphical user interface elements such as buttons to select an enhancement. It may include a way to draw a rectangle, circle, free form shape, or other region or boundary. It may include buttons to label the selected region or the entire image. It may include buttons or other graphical user interface elements to indicate if an image is acceptable, needs enhancement, and if an enhancement was helpful.

Examples of tasks a neural network may perform include, but are not limited to, image tagging, object classification, object detection, and image segmentation. In an image tagging task, the deep neural network might be tasked with labeling an image with tags identifying objects/activities present in the image. In one embodiment, a tagging system may label the image training data set with all the relevant tags, possibly selected from a known set of available tags. In an object classification task, the deep neural network might be tasked to classify the object in the image. The training set may be created by labeling images in the training set with a tag representing the object category.

In an object detection task, the deep neural network might both localize and classify the objects or items in the image (or objects/items in a video, or items (words, sound sources, etc.) in a sound recording). The training set may provide localization information for all the objects in the image (polygon region) as well as the classification tag of the objects associated with each of the localizations. In an image segmentation task, the deep neural network might label each pixel in the image as belonging to a segment. The training system may label the image pixels in training images with the segment it belongs to. In the above examples, the tagging system may be a manual tagging system based on human input, an automated system (e.g., a previously created AI system), or a combination of the two. For example, a previously created system may apply tags with a confidence interval, and tags below a threshold confidence level may be reviewed by human operators.

The digital item might not be limited to an image. For example, the task may include tagging speech or other audio in an audio file or identifying events in a movie. It should also be understood that a movie or video may comprise both a set of images and an audio recording. Enhancements to an audio file may include the suppression of background noise, adjusting pitch, or adjusting the speed of the playback of the audio file.

As mentioned, the performance of a deep neural network may generally be limited by the quality of the training set and its annotations, but under some circumstances a deep neural network may perform better than human operators because the deep neural network does not necessarily view the data as humans do. For example, the deep neural network may be able to decipher more information than humans are able to easily perceive. As an example, humans might not be able to find objects in a dark image as well as deep neural networks. However, when data labeling is performed manually, the limitations of the human operators to distinguish features in dark images will limit the annotations available to the deep network, in turn limiting the deep neural networks ability to solve problems in such challenging environments. Improvement to the training set data to allow better annotations will produce a better deep neural network. Making the information apparent in the training data (images, movies, etc.) by enhancing the training data prior to tagging by a human operator allows the human operators to produce better annotations, but training on an unenhanced data may allow a production neural network to run faster by allowing the production neural network to run on unenhanced data, obviating the need for enhancement of the data.

Additional information may be made apparent to the human operators by introducing an additional step in the creation of a neural network whereby the images are processed using enhancement techniques to help human data labelers annotate relevant information present in the image. This is different from data augmentation techniques for deep neural network training, in that data augmentation is a method in which the training data is artificially increased by creating variations of the real data, e.g. rotation, scaling, color shift, etc. One difference between enhancing the training set and data augmentation is that data augmentation is performed on already labeled data in order to provide added variations. Data augmentation may be combined with data set enhancement by, for example, augmenting a raw training set that is used by the training system after the enhanced data is labeled.

In one embodiment, the system initially receives a raw training set comprising raw images, video, sounds, or other data. In the following examples, image data will be described but other data is contemplated. An enhancement system enhances the raw images to produce an enhanced data set comprising enhanced images, tracking the correlation between raw images and enhanced images. The enhancement system may be either an automated AI system or based on user input via a user interface. A labeling system annotates the enhanced images with tags (e.g., positive/negative or categories of objects). The labeling system may be a user interface used by human operators to apply tags the enhanced images. It may also be a previously created AI system, which may provide confidence levels that allow human review of low confidence tags. Once the enhanced images are tagged, the tags may be saved with the original raw image correlating to the enhanced image that was used for creating the tags, thus creating an annotated data set. In an alternative embodiment, both the raw and enhanced image may be presented to the human operator. In another alternative, the enhanced image may also be saved. Once the raw images are associated with the tags in the annotated data set, the annotated data set may be used by a training system to train a deep neural network.

Below are some examples of challenging scenarios where enhancing images may be helpful. As discussed above, image enhancement may be done for each of these conditions before labeling. Possible Examples include but are not limited to:

1. Adverse Lighting: Image labeling for poorly lit or highly lit environments is a challenge as objects might not be clearly visible, either because the scene is too dark or too bright.

2. Extreme Weather: Extreme weather conditions (heavy snow, rain, fog, etc.) can create challenges for data labeling.

3. Particulate Matter: Matter suspended in the air (e.g., smoke, smog, ash, and/or soot) may cause visibility problems that disrupt the data annotation process.

Possible enhancement may include, but are not limited to:
1. Adjusting the image contrast or brightness
2. Adjusting the gamma for the image
3. Use image sharpening techniques (e.g., an unsharp mask)
4. Perform de-blurring (removes image blur)
5. Perform de-noising (removes undesired noise from the image)
6. Implement de-fisheye (converts fisheye to normal/panoramic image)
7. Edge detection (can highlight things which are otherwise invisible)
8. Adjust tone map (map one set of colors to another set)
9. Color channel swapping (RGB->RBG->GRB->GBR->BGR->BRG)
10. Image filtering (e.g., a special filter that helps improve image quality for underwater scenes, astronomical images, etc.)

The above image adjustments/enhancements for the above challenging scenarios may improve the data annotation process, which can in turn help train a more robust deep neural network model that can perform accurately. Two or more enhancements may be combined.

In an example, an AI system may comprise a 20-layer encoder-decoder style network with residual connections. This network architecture consists of convolution (encoder) layers followed by deconvolution (decoder) layers. In this example, the convolution layers take the input image and extract fine-to-coarse feature representations before using the second-half of the network (decoder) to go back up to the original image size in a coarse-to-fine manner Such an AI system may for example be trained with manually created pairs of images (original and enhanced). The network-related information loss may then be computed by taking the difference between the reconstructed input (network output image) and the actual enhanced image. Batch normalization may be employed prevent the AI system from learning noise parameters and thus overfitting to the training data. Such an arrangement should be considered exemplary rather than limiting, as it represents only one of myriad ways of constructing the image enhancement AI system. The same goal may be achieved using other types of AI systems that may include for example different network designs, different numbers of layers, different layer configurations, different techniques for dealing with overfitting, etc. Still other types of AI systems are contemplated.

FIG. 1 is a flowchart illustrating a method in accordance with one embodiment. The flowchart may be implemented as a series of steps or a collection of services, or any combination thereof. In the example shown in FIG. 1, at step 101, a labeling system receives a raw data set of digital files. In one embodiment, the digital files are images, but the method is not so limited, and may include for example video, audio, and other media types, or combinations thereof. At step 103, the digital files are enhanced. This step may be performed by either an automated AI system or by a user using a user-interface. It may be performed solely on images requiring enhancement or also on other images.

At step 105, the enhanced data set is tagged. The enhanced data set may include at least one enhanced digital file. In some embodiments, all digital files may be enhanced, or some may be identical to images received in the raw data set. In one embodiment, the enhanced digital files may be sent to a tagging system that has a user interface to present the enhanced digital file to a human operator for tagging. At step 107, the tags are combined with the raw digital files and used to train a neural network to perform the task.

Figure 2:
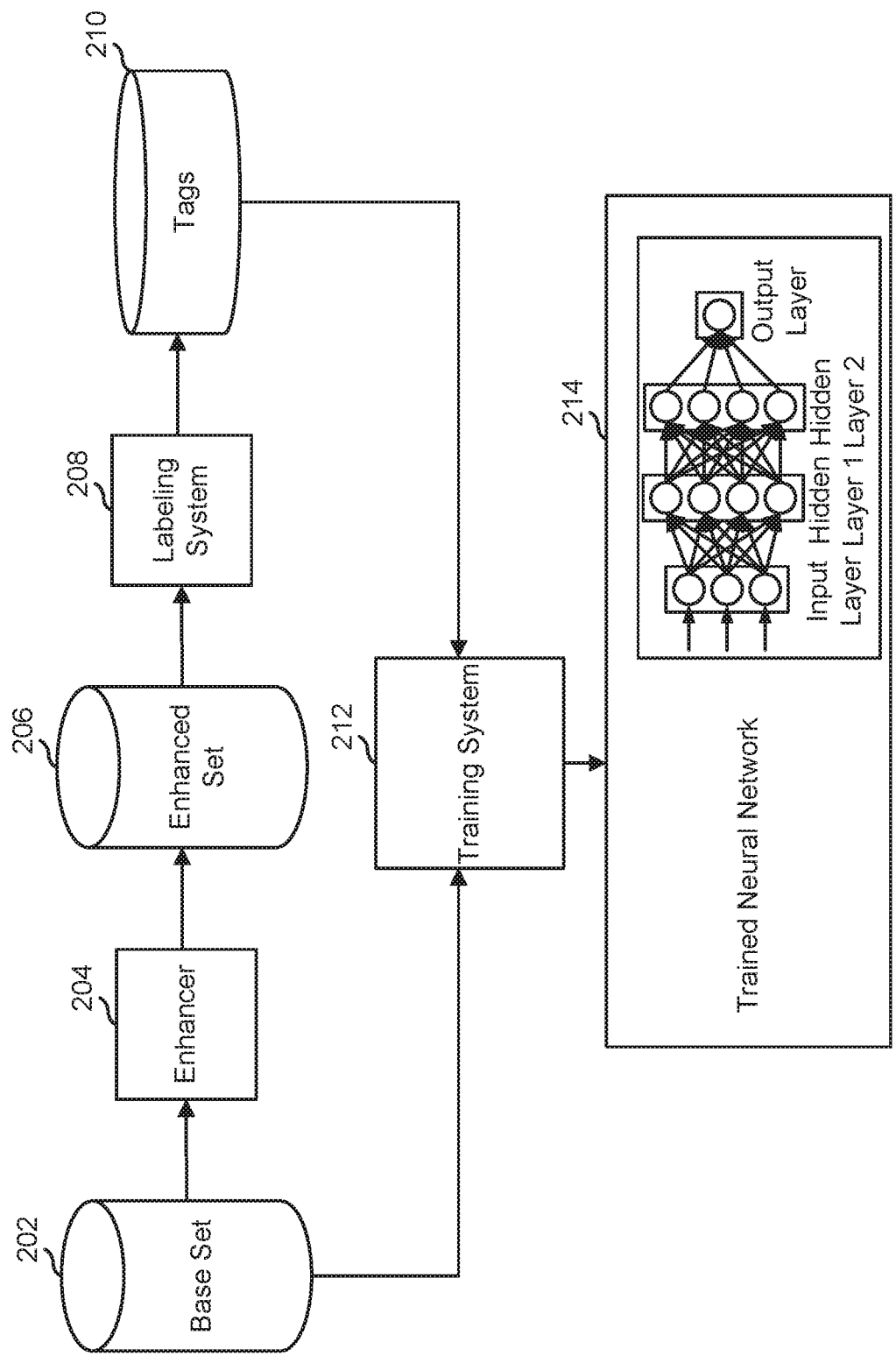
FIG. 2 is a block diagram illustrating a data flow for creating a tagged dataset for training a neural network.

FIG. 2 is a block diagram illustrating the data flow in accordance with one embodiment. The base set or raw data set is stored in a base set database 202 or other information storage system. The base set is received by an enhancer 204 (which might be an enhancer, an enhancement module, and/or an enhancing neural network) of the image tagging system which enhances the base set. In one embodiment, the base set may be images, and the enhancer 204 may apply an enhancement, for example increasing the lighting of images that are detected as too dark. In another embodiment, the enhancer may apply the enhancement to all images, e.g., the enhancer may lighten all images. Other enhancements, as described above, are contemplated. The enhancements may be selected automatically (e.g., by a neural network) or by a user using a user interface. The enhancer saves the enhanced images in an enhanced set database 206. The enhanced set is then provided to a labeling system 208 of the image tagging system. The labeling system may, in one embodiment, provide the enhanced set to a user interface, allowing human operators to tag the enhanced digital files of the enhanced set database 206. In another embodiment (not shown) both the base set and the enhanced set may be provided to the human operators. The labeling system saves tags created by the labeling system in a tag database 210, which correlates the tags to digital files of the enhanced set and the base set. A training system 212 has access to both the tag database 210 and the base set database 202, and uses the tags and the correlation of the tags to the base set to train a neural network, producing a trained neural network 214 to perform the task. In some cases, the tags and the correlation of the tags to the base set may be referred to as a correlation set. The correlation set may be the same as the tag database 210, or may be a superset of the tag database 210.

Figure 3:
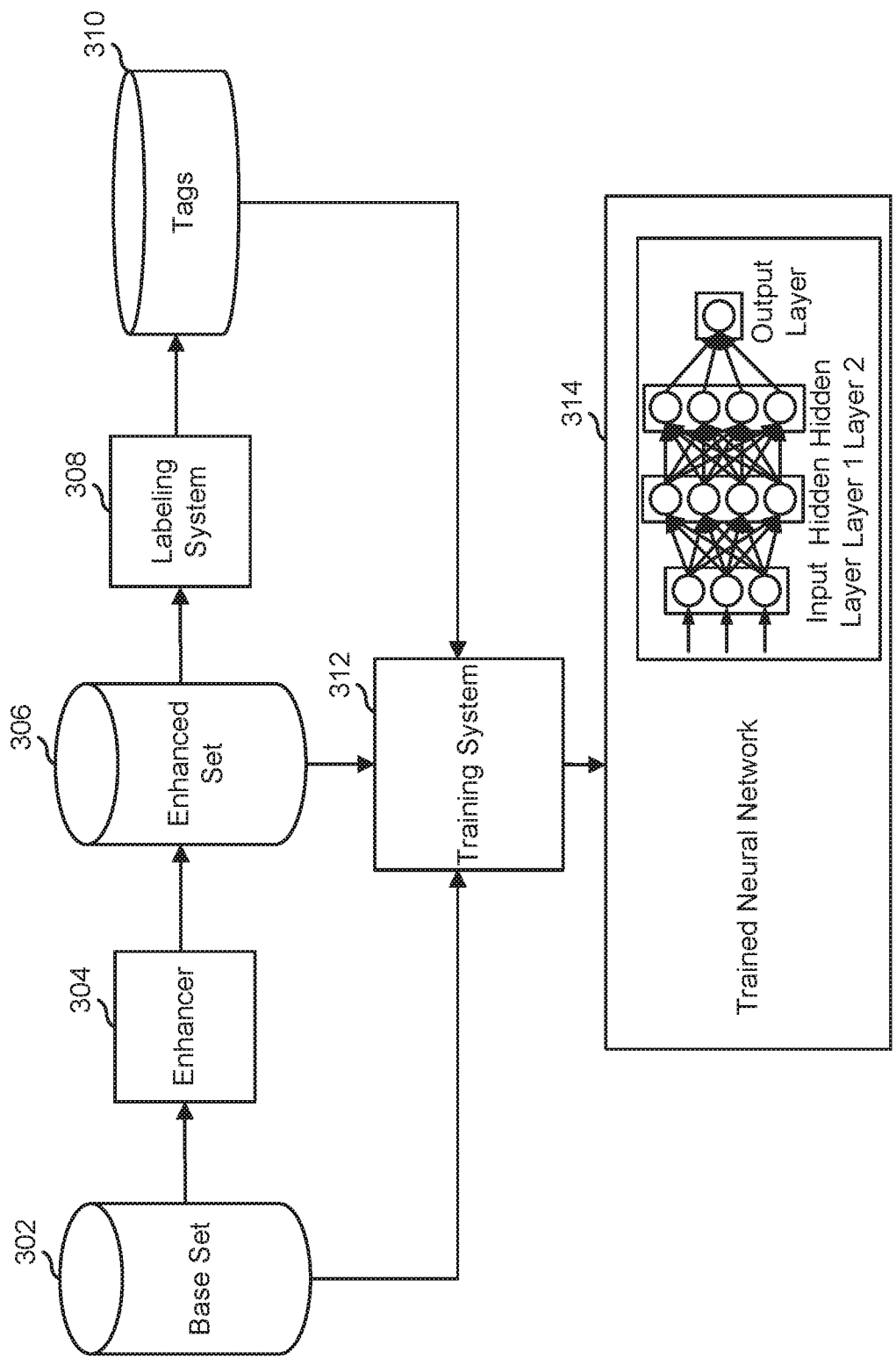
FIG. 3 is a block diagram illustrating a data flow in a second embodiment of a system for creating a tagged dataset for training a neural network.

FIG. 3 is a block diagram illustrating the data flow in accordance with a second embodiment. The base set is stored in a base set database 302 or other information storage system. The base set is received by an enhancer 304 of the image tagging system which enhances the base set. In one embodiment, the base set may be images, and the enhancer 304 may apply one or more enhancements to some or all of the images. The enhancements may be selected automatically or by a user using a user interface. The enhancer saves the enhanced images in an enhanced set database 306. The enhanced set is then provided to a labeling system 308 of the image tagging system. The labeling system may, in one embodiment, provide the enhanced set to a user interface, allowing human operators to tag the enhanced digital files of the enhanced set database 306. In another embodiment (not shown) both the base set and the enhanced set may be provided to the human operators. The labeling system saves tags created by the labeling system in a tag database 310, which correlates the tags to digital files of the enhanced set and the base set. In this embodiment, a training system 312 has access to the tag database 310, the enhanced set database 306, and the base set database 302. The training system 312 uses the tags in the tag database 310 and the correlation of the tags to the base set and the enhanced set to train a neural network, producing a trained neural network 314 to perform the task. The training system 312 may, in one embodiment, use both the enhanced set database 306 and the base set database 302 for training. In another embodiment, the training system 312 may use an enhanced file when an enhanced version of a file is available and use the base set when no enhanced version is available.

Figure 4:
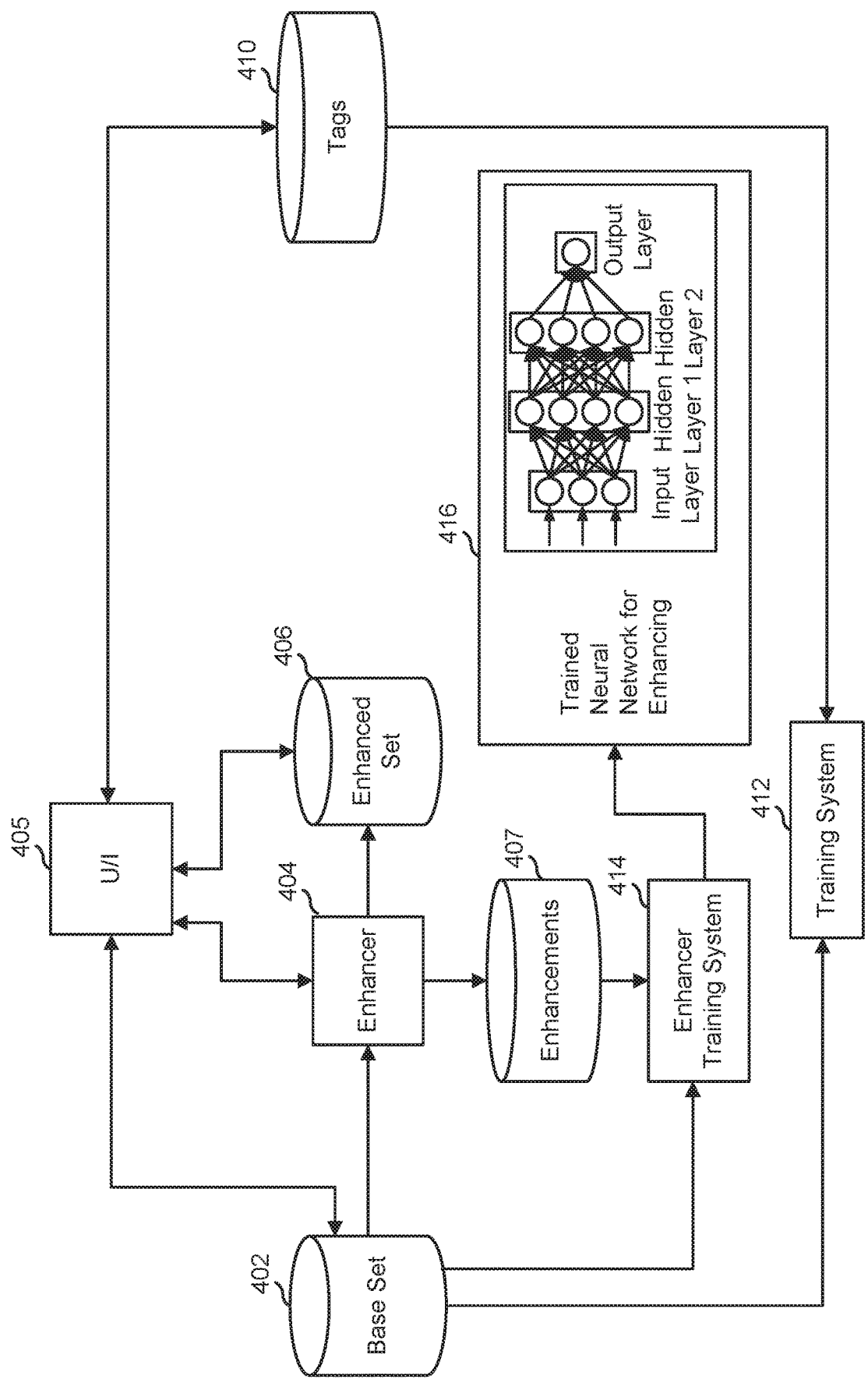
FIG. 4 is a block diagram illustrating a data flow in a system for tagging a training set for training a neural network for an identification task and for creating a database of enhancements for training a neural network to apply enhancements.

FIG. 4 is another block diagram illustrating data flow in accordance with another embodiment. The base set is stored in a base set database 402. The base set is received by an enhancer 404 connected to a user interface or U/I module 405. The user interface 405 may present a raw digital item from the raw data set or base set to a user, allowing the user to indicate if an enhancement is necessary and what enhancement or enhancements should be applied. In another embodiment, the enhancement may be a single enhancement or may be automatically chosen. The user interface may indicate what enhancement(s) should be applied to the enhancer, which may then apply them, producing an enhanced digital item. The enhanced digital item may be stored in an enhanced set database 406 and the chosen enhancement(s) stored in an enhancements database 407. The enhanced digital item may then be presented to the user interface 405 to allow the user to evaluate if the enhancement was effective in assisting the labeling, which the user may indicate using the user interface.

A measure of the effectiveness of the enhancement may be stored in the enhancements database 407. The measure may be a Boolean (true or false, indicating that the enhancement was or was not effective) or may be a continuous value, for example between 0 and 1, or discrete values (between 0 and 10, zero and 100, or other values). The result of the enhancements, if effective, may be stored in the enhancements database 407.

Once the user, via the user interface, has finished applying enhancements, the enhanced digital item, or the original digital item if no enhancements were necessary or helpful, may be presented to the user via the user interface 405, allowing the user to perform the training task of applying a tag to the digital item or to a portion of the digital item. For example, regions of an image and tags identified by the user may be stored in a tags database 410. The base set and the enhancements may be used by an enhancer training system 414 to train a trained neural network for enhancing 416. The base set and tags may be used by a training system 412 to train a neural network (not shown) to perform the task. In some embodiments, the training system 412 may comprise a training neural network, and/or may accept inputs from the user interface 405.

Figure 5:
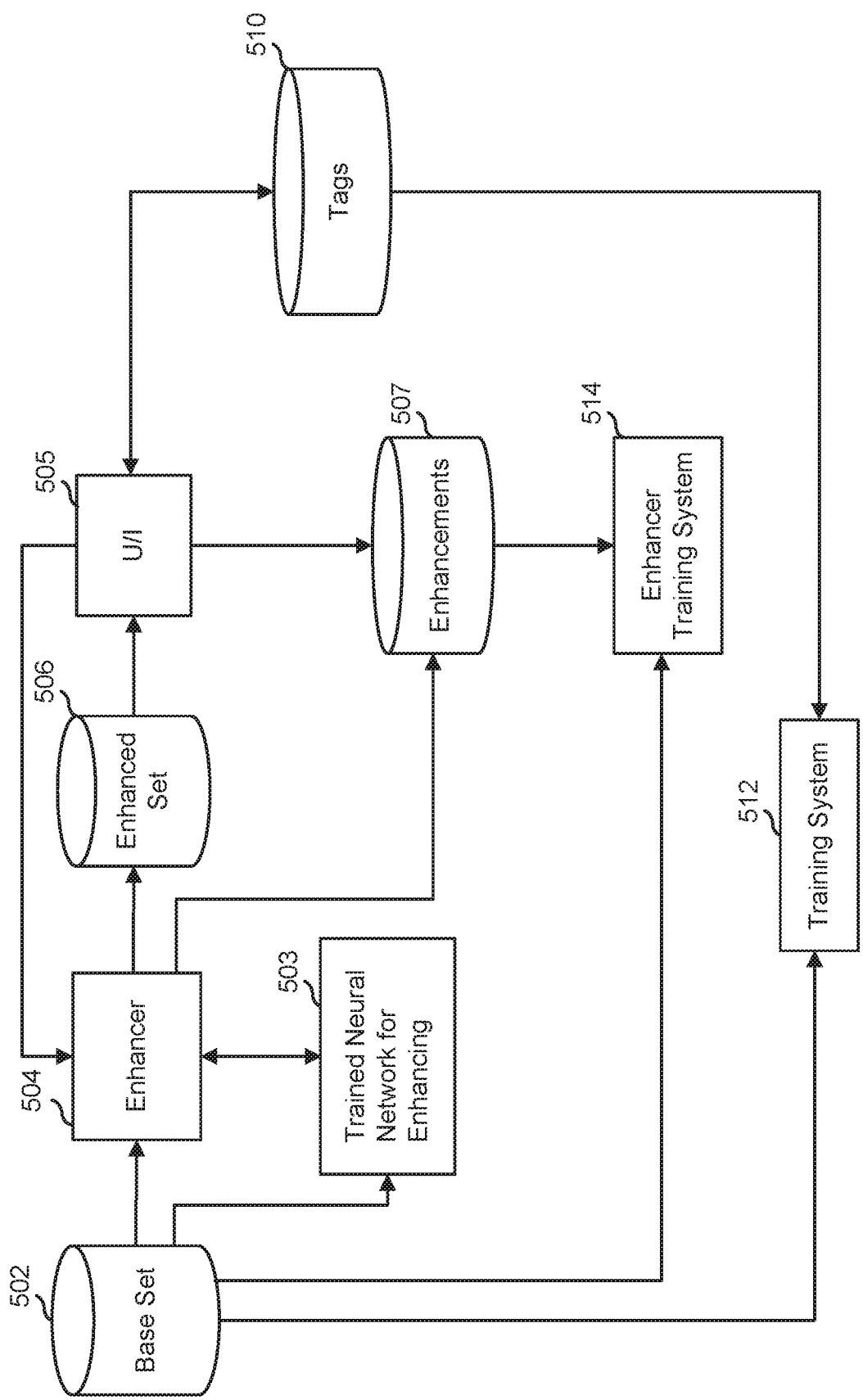
FIG. 5 is a block diagram illustrating a data flow in an embodiment in which a trained artificial intelligence (AI) system applies enhancements to aid a user in tagging a training set for training a neural network.

FIG. 5 is another block diagram illustrating a data flow in accordance with another embodiment. In this embodiment, the base set is stored in a base set database 502. The base set is received by an enhancer 504 and a trained neural network for enhancing 503. The trained neural network for enhancing 503 evaluates if enhancement is likely to aid a training task, and what the enhancement should be, and outputs an enhancement to the enhancer 504 which applies the enhancement(s), creating an enhanced digital item, stored in an enhanced set database 506. The enhancements may be stored in an enhancements database 507. The enhanced digital item may then be presented to a user interface 505 to allow a user to perform the training task by labeling the enhanced image. The tags, including any labeled region, may be stored in a tag database 510. In some embodiments, the user interface may allow user feedback on the enhancements, which are stored in the enhancements database 507. The user interface may also allow user selection of different or additional enhancements, which are performed by the enhancer 504 and stored in the enhancement database 507. The feedback and additional enhancements may be used by an enhancer training system 514 to update the trained neural network for enhancing 503 or to create a new trained neural network for enhancing (not shown). The tags in the tag database 510 may be used by a training system 512 to create a trained neural network for the task, e.g., labeling digital items.

Figure 6:
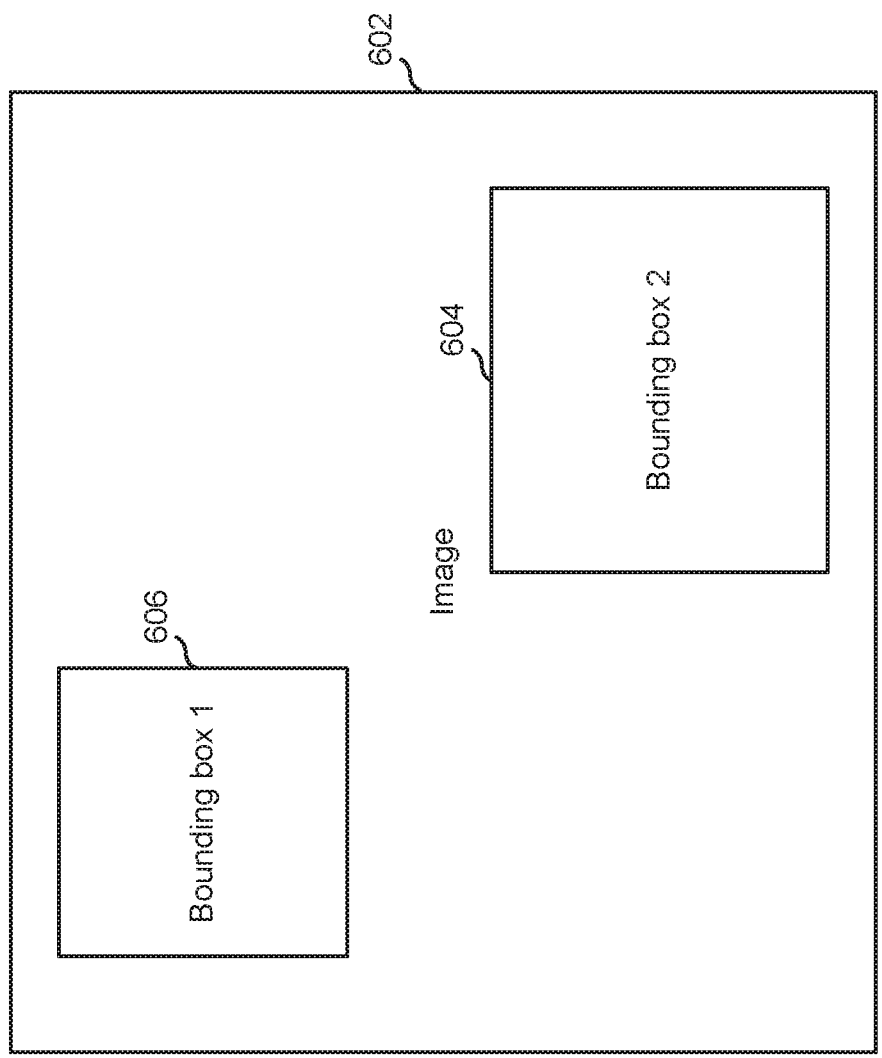
FIG. 6 is a block diagram illustrating a selection of regions in an image for tagging regions to create a tagging set for training a neural network.

FIG. 6 illustrates an exemplary user interface for the tagging system. An image 602 may be presented to a user. The user may draw bounding boxes 604 and 606 or other shapes or boundaries around regions within the image. The user interface may provide additional user interface features (not shown) to allow tags to be associated with bounding boxes 604, 606. Additional user interface features may also allow selection of enhancements or toggling between an enhanced and original, or between different enhancements, of an image.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 7:
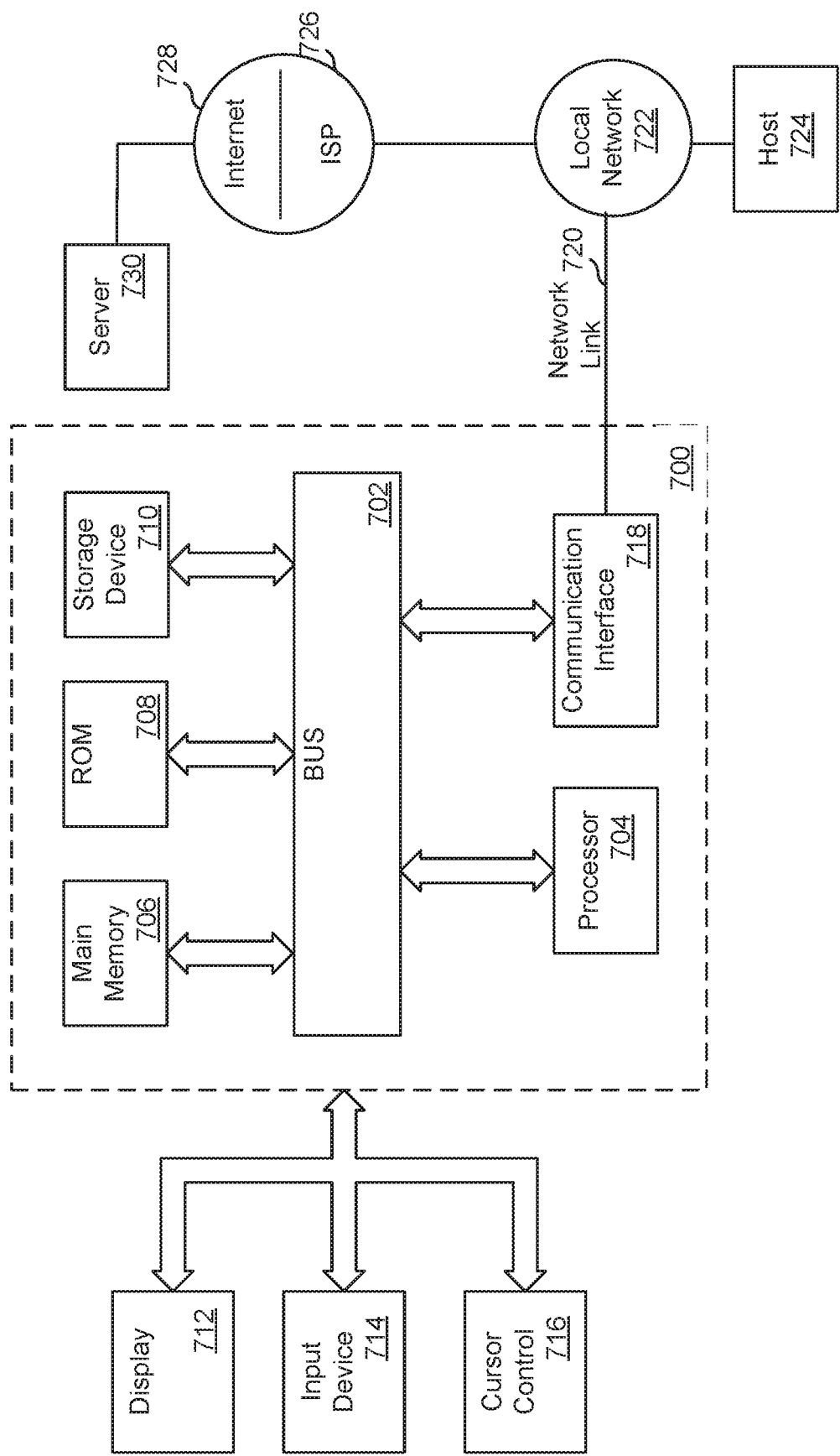
FIG. 7 is a block diagram that illustrates a computer system upon which embodiments may be implemented.

For example, FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a computer monitor, for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a network connection. A modem or network interface local to computer system 700 can receive the data. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

The invention claimed is:

1. A computer-implemented method for creating a training set for a neural network from a base set, the base set comprising a plurality of raw digital items, the method comprising:
   receiving the base set;
   providing a raw digital item of the plurality of raw digital items to a user via a user interface, the user interface providing at least an option to enhance the raw digital item with at least one enhancement;
   using the user interface, receiving a request to enhance the raw digital item with the at least one enhancement;
   with a training system, processing the raw digital item and the request to enhance the raw digital item with the at least one enhancement to produce a trained enhancer;
   using the trained enhancer, applying the at least one enhancement by enhancing the raw digital item to produce an enhanced digital item;
   using a labeling system automatically deriving at least one tag based at least on the enhanced digital item;
   associating the at least one tag with the raw digital item; and
   with the training system, processing the at least one tag and the raw digital item to produce a trained neural network.

2. The computer-implemented method of claim 1, wherein the plurality of raw digital items comprises at least one of a plurality of images, a plurality of videos, or a plurality of sound recordings.

3. The computer-implemented method of claim 2, further comprising receiving, from the user via the user interface, a boundary around an image region in an image of the plurality of images, or around a region in a frame of a video of the plurality of videos, or around a sound region of a sound recording of the plurality of sound recordings.

4. The computer-implemented method of claim 3 further comprising receiving, from the user via the user interface, a tag indicating what the boundary contains.

5. The computer-implemented method of claim 2, wherein the plurality of raw digital items comprises a plurality of sound recordings, and wherein the at least one enhancement comprises at least one of suppression of background noise, adjusting pitch, or adjusting a speed of audio playback.

6. The computer-implemented method of claim 1, wherein the plurality of raw digital items comprises one of a plurality of images or a plurality of videos, and wherein the at least one enhancement comprises at least one of rotation, scaling, color shift, contrast adjustment, brightness adjustment, gamma adjustment, sharpening, de-blurring, de-noising, de-fisheye, edge detection, tone map adjustment, color channel swapping, or image filtering.

7. The computer-implemented method of claim 1, wherein the enhancer stores the at least one enhancement in an enhancement database, the method further comprising:
   receiving feedback from the user interface on an effectiveness of the at least one enhancement;
   storing the feedback in the enhancement database; and
   training an enhancer neural network based on contents of the enhancements database.

8. The computer-implemented method of claim 7, wherein the enhancement database includes an indication of raw digital items that are tagged without enhancement.

9. The computer-implemented method of claim 1, wherein the at least one enhancement is applied to each raw digital item of the base set to create an enhanced set comprising a plurality of enhanced digital items, the method further comprising:
   deriving at least one tag based on each enhanced digital item of the enhanced set to create a set of tags; and
   processing the set of tags and the base set by the training system to produce the trained neural network.

10. The computer-implemented method of claim 9, wherein a first correlation set is stored correlating each enhanced digital item of the enhanced set to a particular raw digital item of the base set, a second correlation set is stored correlating each tag of the set of tags to an enhanced digital item of the enhanced set, and a third correlation set is calculated correlating each tag to one of the raw digital items of the base set, the third correlation provided to the training system with the set of tags and the base set.

11. The computer-implemented method of claim 1, wherein deriving the at least one tag based on the enhanced digital item is further based on the raw digital item, the user interface presenting both the enhanced digital item and the raw digital item.

12. A system, comprising:
   at least one computing device configured to implement one or more services, wherein the one or more services are configured to:
      receive a base set comprising a plurality of raw digital items;
      with a training system, processing a raw digital item of the base set and an enhancement to produce a trained enhancer;
      with the trained enhancer, without a user input, automatically apply the enhancement to the raw digital item of the base set to create an enhanced digital item corresponding to the raw digital item;
      receive at least one tag based at least on the enhanced digital item;
      associate the at least one tag with the raw digital item; and
      with the training system, process the at least one tag and the raw digital item to produce a trained neural network.

13. The system of claim 12, wherein the plurality of raw digital items comprises a plurality of images or a plurality of videos.

14. The system of claim 13, wherein the enhancement comprises at least one of rotation, scaling, color shift, contrast adjustment, brightness adjustment, gamma adjustment, sharpening, de-blurring, de-noising, de-fisheye, edge detection, tone map adjustment, color channel swapping, or image filtering.

15. The system of claim 12, wherein the plurality of raw digital items comprises a plurality of sound recordings.

16. The system of claim 15, wherein the enhancement comprises at least one of suppression of background noise, adjusting pitch, or adjusting a speed of audio playback.

17. The system of claim 12, wherein the at least one tag is received from a training neural network different from the trained neural network and configured to localize and classify items in the enhanced digital item.

18. The system of claim 12, wherein the training neural network provides confidence levels for each tag of the at least one tag, and wherein a user interface is configured to allow a user to review low confidence tags.

19. The system of claim 12, wherein an enhancer stores the enhancement in an enhancement database, wherein the one or more services are further configured to:
   receive feedback from a user interface on an effectiveness of the enhancement;
   store the feedback in the enhancement database; and
   train a neural network based on the enhancements database.

20. The system of claim 12, wherein the enhancement is applied to each raw digital item of the base set to create an enhanced set comprising a plurality of enhanced digital items, wherein the one or more services are further configured to:
   create a set of tags from the enhanced set, wherein the set of tags comprises at least one additional tag from each enhanced digital item other than the enhanced digital item and the at least one tag based at least on the enhanced digital item; and
   process the set of tags and the base set by the training system to produce the trained neural network.

21. The system of claim 12, wherein a first correlation is stored correlating the enhanced digital item to the raw digital item, a second correlation is stored correlating the at least one tag to the enhanced digital item, and a third correlation calculated correlating the at least one tag to the raw digital item, wherein the third correlation is provided to the training system.

22. The system of claim 12, wherein a user interface presents the raw digital item to a user to allow the user to provide the at least one tag, the user interface presenting both the enhanced digital item and raw digital item.

23. A computer-implemented method for creating a training set for a neural network from a base set comprising a plurality of raw images comprising:
   receiving the base set;
   providing the base set to an enhancing neural network which, for at least one raw image of the base set, selects an enhancement to the raw image to create an enhanced image;
   providing the enhanced image and the at least one raw image to a user interface;
   receiving, from the user interface, feedback regarding the enhancement and at least one tag for the raw image;
   training a second enhancing neural network based on the feedback; and
   training a third neural network based on the at least one tag and the base set.

24. The computer-implemented method of claim 23, wherein the feedback includes assigning a value indicating effectiveness of the enhancement.

25. The computer-implemented method of claim 23, wherein the feedback allows applying a second enhancement.

* * * * *

UNITED STATES PATENT AND TRADEMARK OFFICE
CERTIFICATE OF CORRECTION

| | |
|---|---|
| PATENT NO. | : 11,868,437 B1 |
| APPLICATION NO. | : 17/039274 |
| DATED | : January 9, 2024 |
| INVENTOR(S) | : R J Burnham et al. |

It is certified that error appears in the above-identified patent and that said Letters Patent is hereby corrected as shown below:

In the Claims

Claim 1, Column 14, Line 34, Change: "using a labeling system automatically deriving" to "using a labeling system, automatically deriving"

Signed and Sealed this
Thirteenth Day of February, 2024

Katherine Kelly Vidal
*Director of the United States Patent and Trademark Office*